(12) United States Patent
Abeloe et al.

(10) Patent No.: US 10,496,701 B2
(45) Date of Patent: Dec. 3, 2019

(54) SYSTEMS AND METHODS FOR VIDEO ARCHIVE AND DATA EXTRACTION

(71) Applicant: INTEGRITY APPLICATIONS INCORPORATED, Carlsbad, CA (US)

(72) Inventors: Kenneth A. Abeloe, Carlsbad, CA (US); Dennis Hsu, San Diego, CA (US)

(73) Assignee: Centauri, LLC, Chantilly, VA (US)

( * ) Notice: Subject to any disclaimer, the term of this patent is extended or adjusted under 35 U.S.C. 154(b) by 188 days.

(21) Appl. No.: 15/656,496

(22) Filed: Jul. 21, 2017

(65) Prior Publication Data

US 2018/0025009 A1 Jan. 25, 2018

Related U.S. Application Data

(63) Continuation of application No. 14/798,207, filed on Jul. 13, 2015, now Pat. No. 9,721,011, which is a continuation of application No. 13/906,210, filed on May 30, 2013, now Pat. No. 9,081,855.

(60) Provisional application No. 61/653,989, filed on May 31, 2012.

(51) Int. Cl.
*G06F 16/78* (2019.01)
*G06K 9/00* (2006.01)
*G06F 16/11* (2019.01)
*G06F 16/783* (2019.01)

(52) U.S. Cl.
CPC ........ *G06F 16/7867* (2019.01); *G06F 16/113* (2019.01); *G06F 16/783* (2019.01); *G06F 16/7837* (2019.01); *G06F 16/7847* (2019.01); *G06K 9/00637* (2013.01); *G06K 9/00718* (2013.01)

(58) Field of Classification Search
CPC ........... G06F 17/3082; G06F 17/30073; G06F 17/30784
USPC ....................................................... 382/305
See application file for complete search history.

(56) References Cited

U.S. PATENT DOCUMENTS

2008/0278604 A1* 11/2008 Watkins ............... H04N 21/235
348/231.2
2012/0078955 A1* 3/2012 Boguraev ................ A61B 5/00
707/769

* cited by examiner

*Primary Examiner* — Amandeep Saini
(74) *Attorney, Agent, or Firm* — Knobbe, Martens, Olson & Bear, LLP

(57) ABSTRACT

Systems and methods for full motion video search are provided. In one aspect, a method includes receiving one or more search terms. The search terms include one or more of a characterization of the amount of man-made features in a video image and a characterization of the amount of natural features in the video image. The method further includes searching a full motion video database based on the one or more search terms.

12 Claims, 7 Drawing Sheets

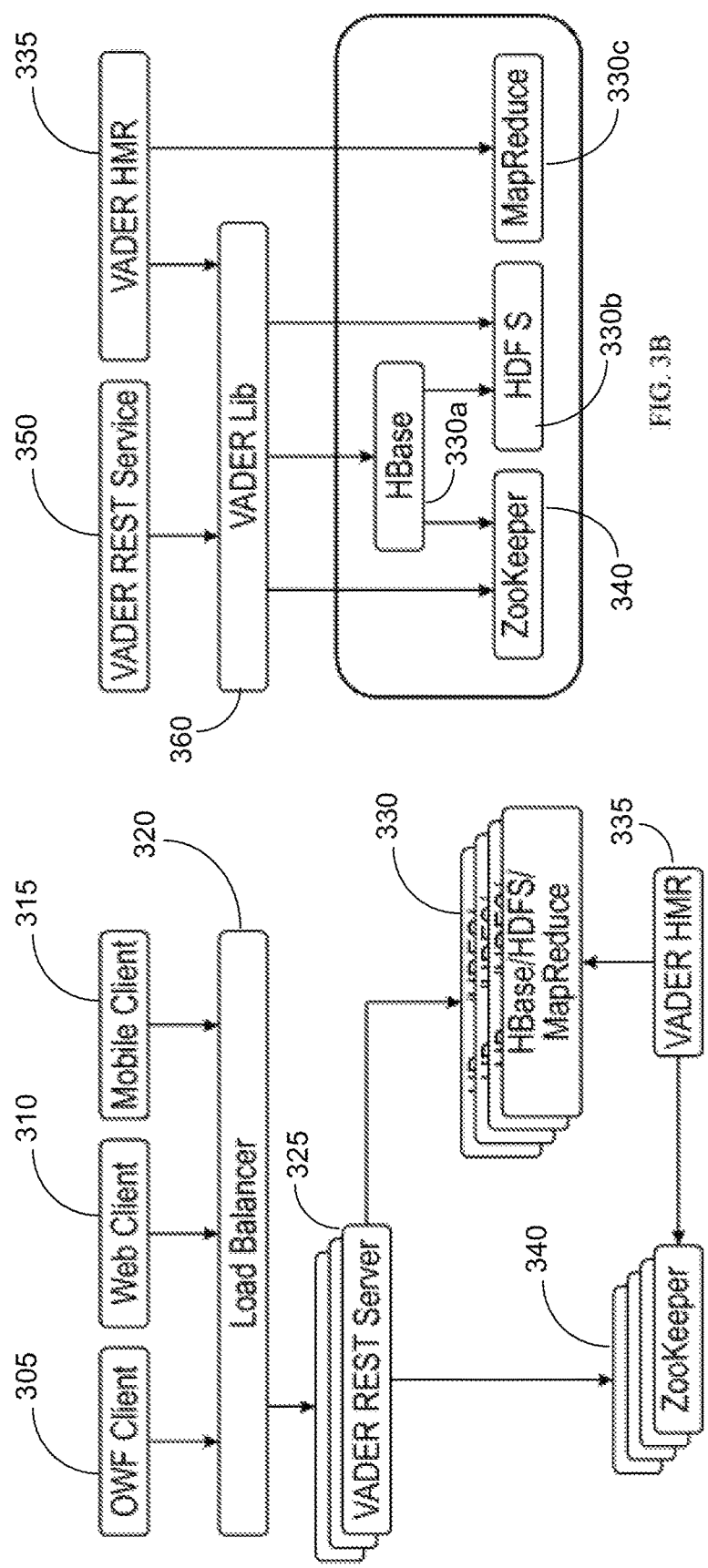

SYSTEMS AND METHODS FOR VIDEO ARCHIVE AND DATA EXTRACTION

CROSS REFERENCE TO RELATED APPLICATIONS

This application is a continuation of U.S. application Ser. No. 14/798,207, filed Jul. 13, 2015, now U.S. Pat. No. 9,721,011, which is a continuation of U.S. application Ser. No. 13/906,210, filed May 30, 2013, now U.S. Pat. No. 9,081,855, which claims the benefit of U.S. Provisional Application No. 61/653,989, filed May 31, 2012, entitled Video Archive and Data Extraction Resources (VADER), and assigned to the assignee hereof. The disclosures of these prior applications are considered part of this application, and are hereby incorporated by reference in their entirety.

GOVERNMENT RIGHTS

Government Rights: This invention was made with government support under Contract No. N68936-11-D-0022 awarded by Naval Air Warfare Center Weapons Division China Lake. The government has certain rights in the invention.

BACKGROUND

Field

This invention relates to video archive and data extraction, more specifically, to scalable video archive and data extraction systems and methods.

Background

With the continued threats to U.S. Forces abroad, multi-INT surveillance and analysis remains vital for intelligence operations. Although the analysis of video data is time intensive, subjective, and imprecise, it remains a key Global War on Terrorism (GWOT) intelligence source. The ability to quickly retrieve relevant, corrected video opens multiple avenues for improved analysis, exploitation, and situational awareness. Moreover, the inclusion of video affords the opportunity to easily analyze video and signals intelligence (SIGINT) sources together providing options for target identification, data fusion, and nodal analysis. Accordingly, improved systems and methods for retrieving corrected video would facilitate many operational process, including intelligence operations.

SUMMARY

An innovation, which may be referred to as Video Archive and Data Extraction Resources (VADER), offers a fresh new approach for efficient and accurate geospatial retrieval of collected video, based on geospatial, temporal, and scene-specific salient attributes. VADER represents inventive, intelligent search methods and systems for video data. Certain aspects of systems and methods which may be incorporated in VADER (or other video archive and/or data extraction systems and methods) are described in further detail herein.

One innovation includes a method of adding a video entity to a full motion video database supporting search capabilities, the method comprising determining a starting cell in the full motion video database, if the starting cell is not full, adding the video entity to the starting cell. The method can further include if the starting cell contains a plurality of child cells: determining a child cell from the plurality of child cells based on the video entity, and recursively add the video entity using the child cell as a starting cell. Also, if the starting cell is full, determine a split axis by splitting the starting cell, create two new child cells along the split axis, move one or more entities from the starting cell to the two new child cells, and add the video entity to one of the two new child cells.

The method may further include classifying at least a portion of the video entity as including one or more of manmade features and natural features. In some implementations, the classification is based at least in part on edge coherence. In some implementations, the method may include identifying one or more buildings in at least a portion of the video entity. In some implementations, the method may include identifying one or more of a size, color, shape solidity, rooftop lack of detail, strong edges, and cast shadows of the identified one or more buildings. In some implementations, the method may include receiving a full motion video search request, wherein the search request indicates one or more of a building size, building color, building geo-location attributes, building shape, a building rooftop detail, a building edge characterization, and a building cast shadow characterization. In some implementations, the method may further include receiving a full motion video search request, wherein the search request indicates a characterization of the amount of man-made features in a scene or a characterization of the amount of natural features in the scene.

In another innovation, a method of searching full motion video includes receiving one or more search terms, wherein the one or more search terms comprise one or more of a characterization of the amount of natural features in a scene and a characterization of the amount of man-made features in the scene, and searching a database of full motion video based on the one or more search terms.

In another innovation, a method of searching full motion video includes receiving one or more search terms, wherein the one or more search terms comprise one or more of a size of a building, a color of a building, a geo-location attribute of a building, a characterization of rooftop detail of a building, a characterization of cast shadows of a building, and a shape solidity of a building, and searching a database of full motion video based on the one or more search terms.

Other innovations include systems that are configured to perform the above-described methods and other processes described herein. Examples of certain systems are described hereinbelow.

BRIEF DESCRIPTION OF THE DRAWINGS

FIGS. 3A and 3B illustrate VADER Communication Diagram (FIG. 3A) and VADER dependencies (FIG. 3B).

DETAILED DESCRIPTION

VADER may be implemented as a scalable data management platform for geo-spatial videos. It is built on top of big data technologies such as Apache Hadoop, Apache HBase, and Apache ZooKeeper. VADER can automatically upload video data streams or client requested videos where entities are automatically extracted in the background using a variety of video processors (e.g., mover and building extraction). All video content and associated meta-data (e.g., sensor parameters, extracted entities) may be subsequently persisted to the VADER data store and immediately made ready for queries. The VADER data store is designed for extreme scalability and accessible from the Ozone Widget Framework (OWF). While certain examples and implementations of VADER are described herein sometime with some specificity, this description is not meant to limit VADER, or such as system or methods, to any particular implementation or limit the features or an implementation. Instead, certain inventions relating to systems and methods for video archive and data extraction may be recited by the claims of this disclosure, or of a disclosure claiming priority hereto. One example of a VADER operational architecture is illustrated in FIG. 1.

Figure 1:
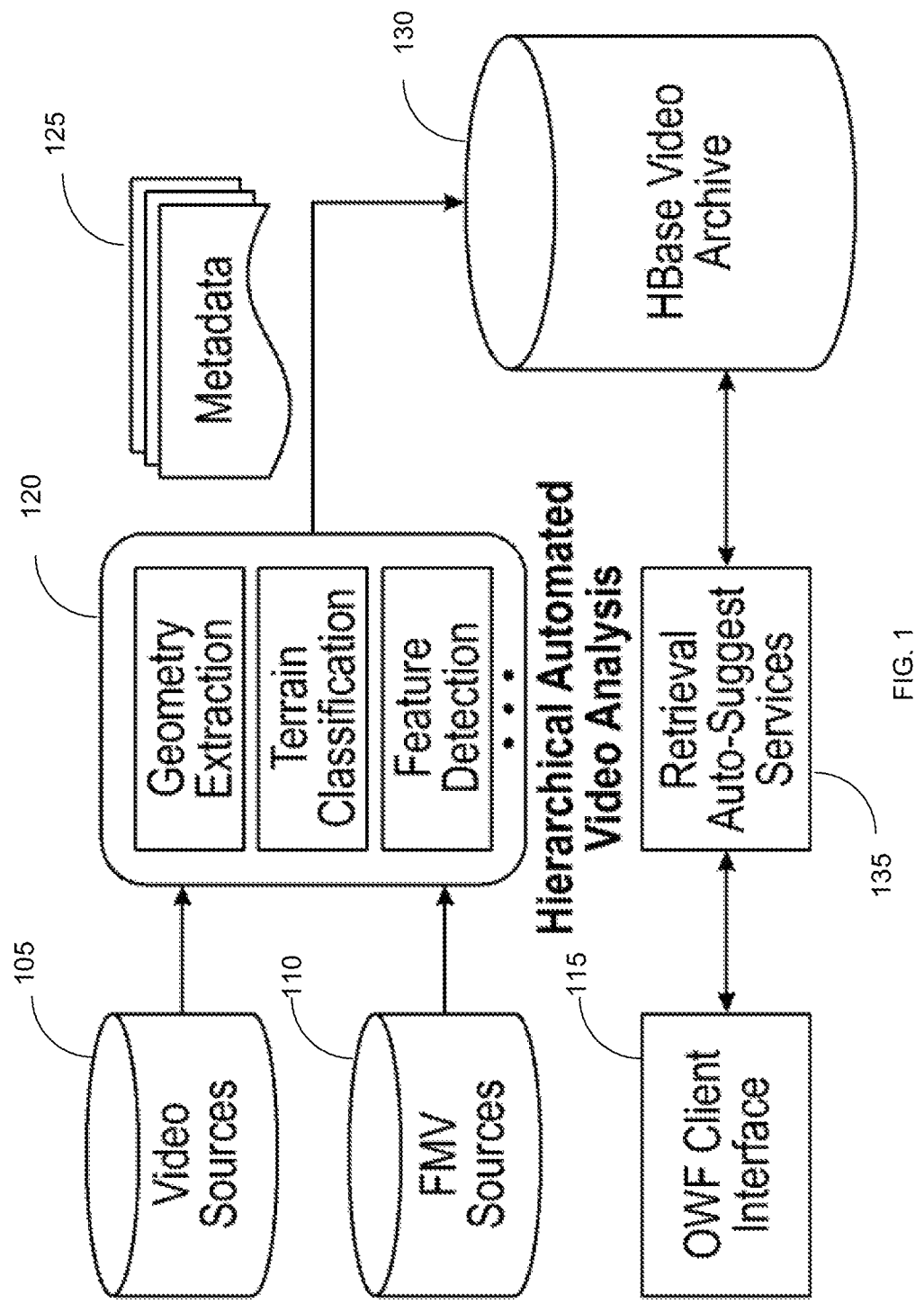
FIG. 1 illustrates VADER operational architecture.

FIG. 1 illustrates a VADER architecture including video sources 105, full motion video (FMV) sources 110, an Ozone Widget Framework (OWF) client interface 115, an extraction, classification, and detection unit 120, metadata 125, an Hbase video archive 130, and retrieval auto suggest services 135.

High level VADER key technical objectives are highlighted below:

Integrate video search and viewer OWF widgets to support video retrieval and display via the VADER distributed data store.

Update video processing components to support fused product analysis—combined full motion video (e.g., full motion video (FMV), ScanEagle) data types with transactional source, e.g., ground moving target indicators (GMTI).

Provide a demonstration capability emphasizing all the key VADER features.

The big data geospatial data store space is embryonic. Major key-value data stores such as HBase, Cassandra, and Accumulo do not provide native geospatial support. MongoDB (a document store) provides geospatial indexing with many caveats. Traditional geospatial databases, such as PostgreSQL with PostGIS, have robust geospatial support; however, lack the scalability required of today's influx of big data such as video sources.

IAI has developed geospatial algorithms on top of key-value data stores to marry big data and geospatial persistence and querying. IAI utilizes HBase for its natural scalability, and perhaps as importantly, for its tight integration with Hadoop. Because our objective is to store geospatial entities extracted from full motion video as well as the videos themselves, IAI leverages HDFS for video storage, MapReduce for video entity extraction, and HBase for entity storage and querying.

Recently, Internet startups like Fwix, SimpleGeo, and Foursquare have begun providing Application Programming Interfaces (APIs) for others to store and retrieve location-based entities. Although highly scalable, consumption of these services require on-line access. Furthermore, all data is stored on their respective servers in a proprietary format.

The following is a comparison between VADER and other products with overlapping concerns:

TABLE 2-1

State-of-the-Art Comparisons[1]

|  | VADER | PostGIS | MongoDB | HBase | Online APIs |
|---|---|---|---|---|---|
| Scalable | Y |  | Y | Y | Y |
| Redundant | Y |  | Y | Y | Y |
| Highly available | Y |  | Y | Y | Y |
| Geospatial querying | Y | Y | Partial |  | Y |
| Fast | Y |  | Y | Y | Y |
| Video Processing | Y |  |  |  |  |
| Video Data Store | Y |  |  |  |  |
| Private Network Access | Y | Y | Y | Y |  |

[1]Online APIs include Fwix, SimpleGeo, and Foursquare public facing interfaces.

In Table 2-1, scalability refers to the ability of the product to handle massive amounts of data without suffering significant performance loss. VADER rides on HBase and Hadoop, and its algorithms are designed to scale to handle full motion video at video frame rates (e.g., 30 frames per second).

In Table 2-1, redundancy means that a server going down will not result in data loss. High availability means that a server going down will not interrupt the service. VADER is both redundant and highly available if slave nodes fail. The Hadoop master node is currently a single point of failure; however, using CDH4, Cloudera's Distribution with Hadoop, provides a highly available master.

VADER builds on a unique algorithm for very fast geospatial queries. MongoDB provides geospatial indexing with one index per Mongo collection.

1.1 Operational Problem

With the continued threats to U.S. Forces aboard, multi-INT surveillance and analysis remains vital for Global War on Terrorism (GWOT) operations. FMV sources (e.g., Predator, Reaper, ScanEagle) yield localized, highly descriptive scene characterization, providing the warfighter with both situational awareness information, as well as cues for enemy intent. Tools currently exist within the warfighter and intelligence communities to analyze and exploit collected tactical FMV, however they have historically, and still presently, suffer from shortcomings.

While FMV provides a certain degree of situational awareness in a real-time environment, tools to quickly analyze processed FMV data have yet to address two major setbacks: precision and efficiency. FMV suffers from inherent sensor pointing and position inaccuracies which, during analysis, causes the reported position of the tactical FMV scene to be potentially erroneous (up to a kilometer from the true physical location). Moreover, FMV scene attribute analysis has been a manual process impeded by subjectivity and time intensity (a human's having to manually annotate video attributes, as well as search through hundreds of gigabytes of raw, unprocessed FMV). Outside of searching on the real-time data, efficient geospatial and temporal retrieval of relevant FMV based on scene attributes or transactional data is a problem which has not yet found an efficient solution.

Although the analysis of FMV data is presently a subjective, protracted, and geospatially imprecise process, it nonetheless remains a key GWOT intelligence source which merits analytical improvement. The ability to quickly retrieve relevant, geospatially-corrected FMV data opens multiple avenues for improved situational awareness, data fusion, and nodal analysis.

1.2 Technical Problem

Traditional geo-spatial databases such as the PostGIS extension for PostgreSQL are not designed for the big data era that companies and government agencies face today. These geo-spatial databases have good querying capabilities, but are usually confined to running on a single node. Any sharding[2] of the data is usually implemented manually and further limits query capabilities.

[2]Traditional sharding involves breaking tables into a small number of pieces and running each piece (or "shard") in a separate database on a separate machine. Because of the large shard size, this mechanism can be prone to imbalances due to hot spots and unequal growth.

Conversely, key-value distributed data stores, such as Apache HBase and Apache Cassandra, are designed for massive scale but are extremely restricted in how data can be queried. Furthermore, geo-spatial extensions for these distributed data stores do not currently exist, and for good reason as described below.

Data is sharded across the data store cluster nodes. In HBase, data rows are stored in lexicographical order by row key. Determining the node where the row resides is fast and easy because each node is responsible for a specific key range. However, this creates hot spots in your data store if your row keys are not uniformly distributed. This creates problems for geo-spatial storage because data is often concentrated in relatively few locations and completely absent in others, resulting in a cluster where a few nodes are extremely active and others are underutilized. Using geo-spatial hashing algorithms such as Geo-hash exhibits the same problem. Cassandra provides a random partitioner that distributes rows uniformly and randomly across the cluster. However, if geo-spatial entities are randomly stored, performing a geo-spatial search becomes a full scan of the entire data store which is obviously not scalable.

Figure 2:
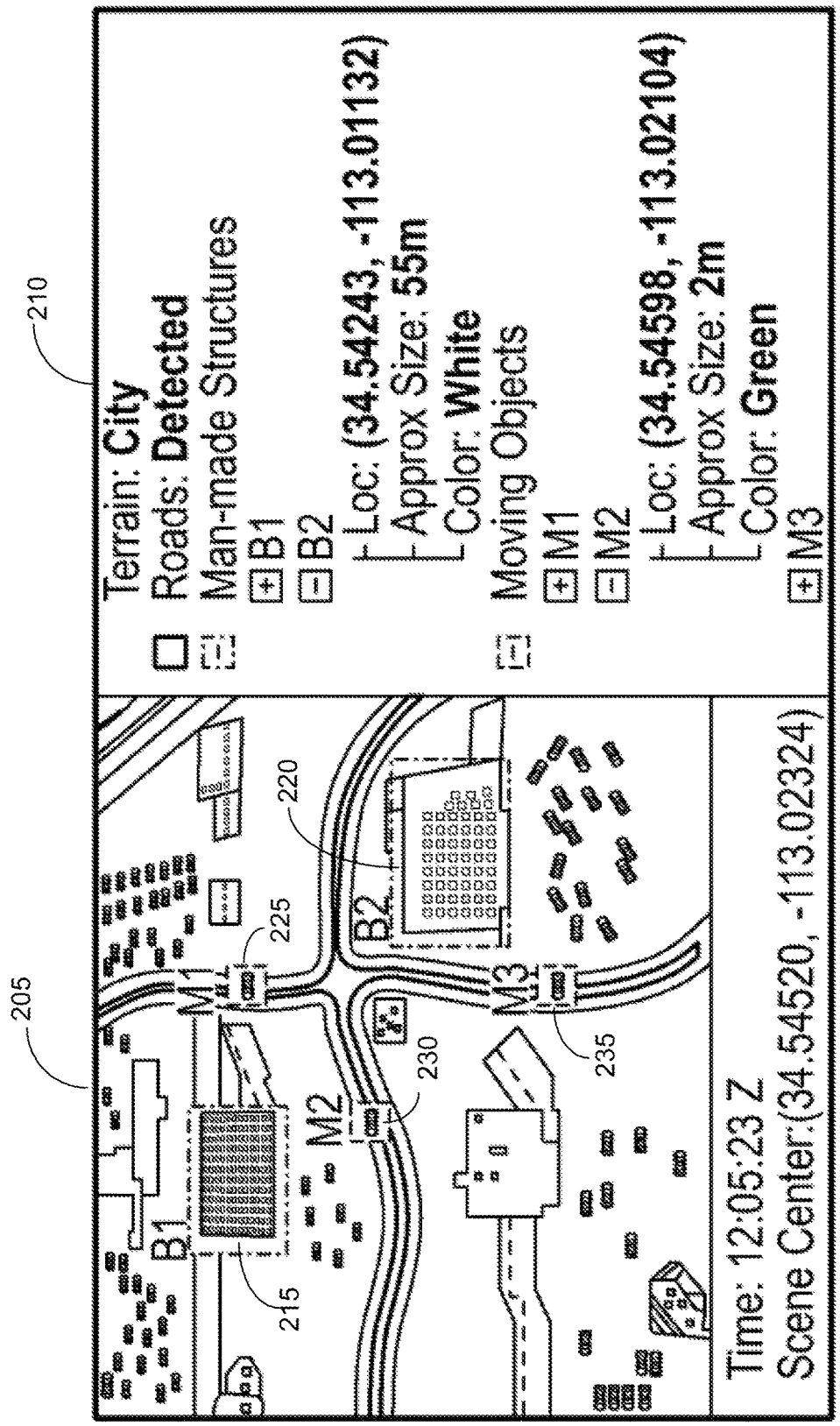
FIG. 2 illustrates Automated scene attribute analysis.

In the video processing domain, the warfighter requires a solution that scales using modern distributed data stores with the capability to perform fast geo-spatial and temporal searches. VADER address the aforementioned issues head-on by providing: a) efficient FMV geospatial and temporal searches and b) automated multi-spectral scene attribute analysis of FMV data (as illustrated in FIG. 2). FIG. 2 shows a full motion video map 205, and results of attribute analysis 210. Man-made structures B1 215 and B2 220 are detected. Moving objects M1 225, M2 230, and M3 235 are also detected.

1.3 Technical Approach

VADER's core is built on top of Apache Hadoop, Apache HBase, and Apache

ZooKeeper. Additionally, VADER uses the Play Framework to expose RESTful services. FIG. 3A shows a communications diagram between various components in the VADER system. These components include an OWF client 305, web client 310, mobile client 315, load balancer 320, a VADER REST Server 325, HBase/HDFS/Map Reduce 330, VADER HMR 335, and ZooKeeper 340.

FIG. 3B illustrates the project dependencies where VADER is currently broken up into 3 subprojects: VADER REST Service 350, VADER HMR (Hadoop MapReduce) 335, and VADER Lib 360. Also shown are ZooKeeper 340, Hbase 330a, HDFS 330b, and MapReduce 330c.

1.3.1 Geospatial and Temporal Query

VADER accomplishes both geospatial and temporal search and balanced data nodes with an algorithm backed by HBase operations rather than using HBase's own search capabilities directly. VADER splits the world into cells. Each cell maps to a row in HBase.

Figure 4A:
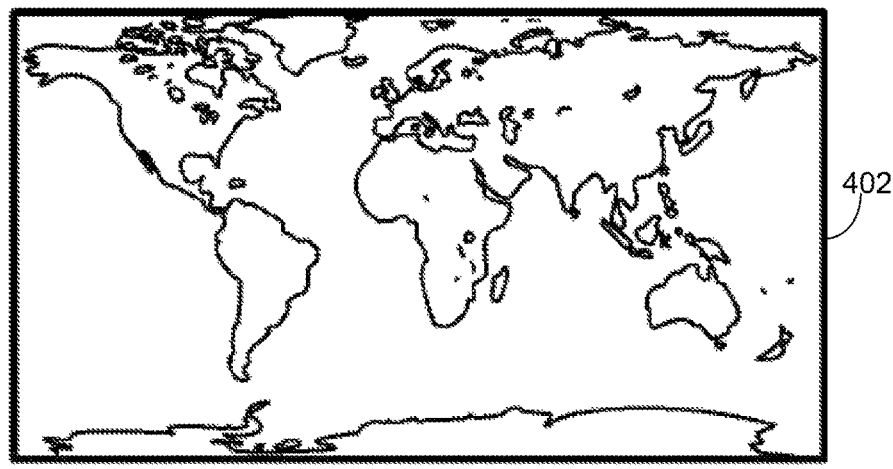
FIGS. 4A-4C illustrate various stages of geospatial entity generation including zero entities (FIG. 4A), populated world cell (FIG. 4B), and populated world cell with child cells (FIG. 4C).
Figure 4B:
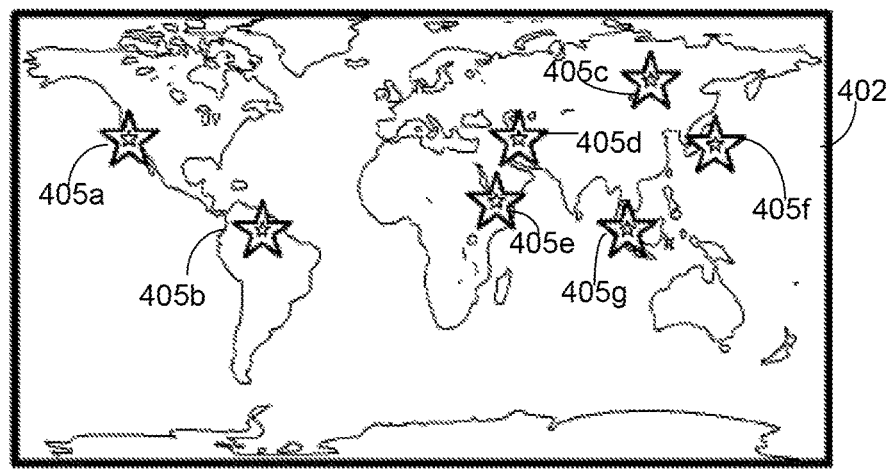
Figure 4C:
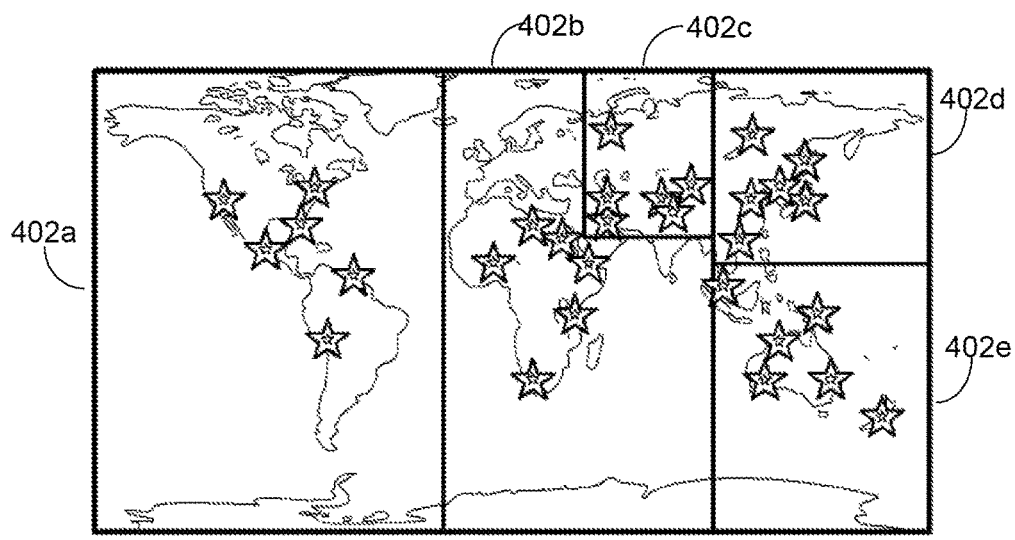

As shown in FIG. 4A, VADER initially has zero geospatial entities, the entire world is contained in one cell 402, and that cell is empty. As we begin generating entities (from processing video or manually addition), we add these entities 405a-g to the cell 402 (see FIG. 4B). While we still have relatively few entities, our search algorithm will retrieve the cell 402, perform a geo-spatial filter on its entities, and return the results. At some point, it no longer makes sense to continue storing entities in a single cell 402. This is triggered transparently when a client adds an entity to the data store and the algorithm determines that the cell 402 has reached its maximum capacity. During this add operation, the algorithm removes all entities from the single world cell 402. It creates two child cells and writes half of the entities to each cell. The original world cell is split along either a line of latitude or longitude at the midpoint between the two median entities along the split's respective axis. Instead of the original world cell 402 directly containing the entities, it now only contains pointers to its child cells 402a-e (see FIG. 4C). This recursive process continues as more and more geospatial data is loaded into the system.

The cell data structure contains the following fields:
Cell ID
Bounding box min latitude
Bounding box min longitude
Bounding box max latitude
Bounding box max longitude
One of the following:
  List of children cell IDs
  List of entities This data structure is be mapped to an HBase table:
Row key is the cell ID, which we create as a random UUID. This ensures uniform distribution across our HBase cluster.
Metadata column family
  MinLat column stores bounding box min latitude
  MinLon column stores bounding box min longitude
  MaxLat column stores bounding box max latitude
  MaxLon column stores bounding box max longitude
Children IDs column family
  Columns are the row keys of the child cells
Entities column family
  Column qualifiers are the entity IDs
  Column values are the raw bytes of the serialized entities The add entity algorithm can be summarized as the following pseudocode:

```
define add entity (params: cell, entity to add)
    if cell contains child cells
        determine which child should contain the entity
        recursively call add entity on that child cell
    else if cell is full
        randomly decide if we should split along lat or lon
        find the 2 median entities along the split axis
        find the midpoint between the 2 median entities
        create two new child cells along the split axis
        remove original entities from the current cell
        add original entities to child cells
        (each child should now contain ½ of the entities)
        add the new entity to the appropriate child cell
    else if cell is not full
        add entity to cell
    end if
end define
```

The resulting geospatial search algorithm begins with the world cell, which is guaranteed to contain the entire search bounding box. VADER services then perform a depth-firstsearch on the cell tree to find leaf cells that intersect the search bounding box and filter the entities accordingly.

Even though HBase itself has consistent writes, the VADER algorithm relies on multiple HBase operations per action. If two clients were to simultaneously add entities that map to the same destination cell, and the cell is at capacity, a data-corrupting race condition occurs. One obvious example is that both add entity actions trigger a split of the same cell. The first split is overwritten by the second split, and so the first entity added is forever lost since no cell points to the two child cells created by the first add operation (one of which contains the added entity). To prevent this, VADER implements a distributed lock using ZooKeeper primitives. A distributed lock is used to protect critical sections across multiple processes across the network.

Although data across the VADER cluster is well-balanced, VADER still has read hot spots—a database objects which are frequently being accessed. This is because every add operation and query must access the HBase node that contains the entry point cell (the overall world cell). Cells closer to the root (entry point) cell tend to be accessed more often, creating a couple of hot spots in the VADER cluster. To counter the frequent access, VADER uses a Least Recently Used (LRU) cache on cells that contain child cell pointers. Cells have the property that, once split, never change again. Thus, VADER can safely cache split cells without fear of dirty cache entries. Currently, VADER uses a cache size of roughly five thousand cells, and has observed roughly a 90% cache hit rate on random cell retrievals with approximately ten million entities in the data store.

VADER video data consumed has the additional dimension of time. To remain scalable for the future, rather than storing all entities ever processed in the same cell tree, VADER creates an entry point cell (a separate cell tree) in week-long intervals for which data exists. If a query's time-bounds cross week boundaries, the spatial query is transparently performed on each overlapped cell tree, and the results are filtered by time.

1.3.2 Video Processing for Relevant Data

In order to combat the ever increasing amounts of data processed by companies and government agencies, the analysis and fusion of video data must be automated to extract relevant data from the large quantity of video sources collected in the field (e.g., FMV, hand-held). In the warfighter community, the ability to quickly retrieve relevant data unlocks the potential for improved data fusion, analytics, targeting, and situational awareness. VADER video processing produces the relevant data.

Given a video from an active stream or file, VADER applies a hierarchy of automatic signature analysis and detection algorithms, including terrain classification, scene object characterization, and motion analysis. VADER implements an abstract interface to support easy algorithm insertion. VADER video analysis algorithms that implement the abstract interface may plug into the VADER framework to extract scene features from ingested video and store the resultant metadata in the VADER video data store. Two examples are provided that demonstrate a global attribute, manmade versus natural classification, and an object attribute, building detection.

Figure 5C:
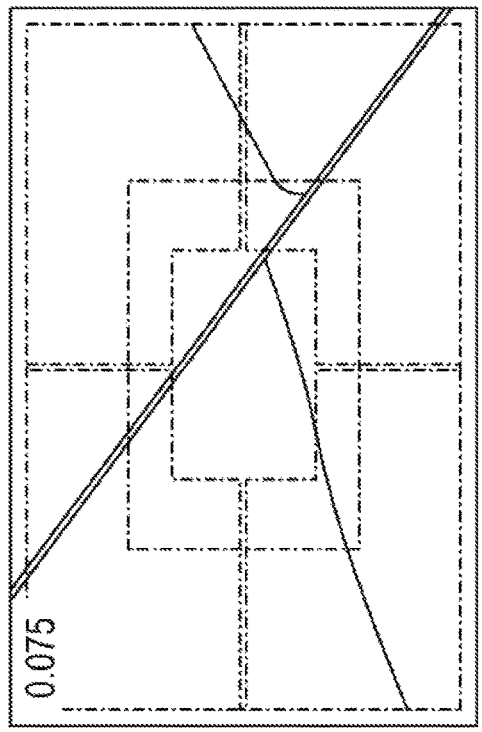
FIGS. 5C-D illustrate a scene classifier algorithm showing natural scenes.
Figure 5D:
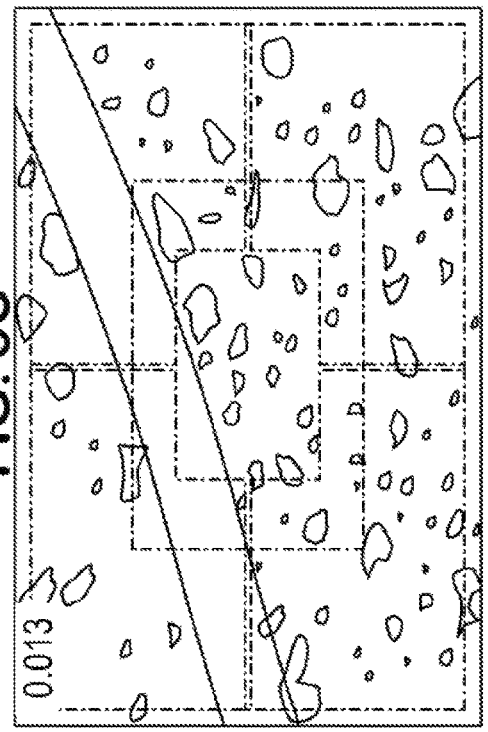
Figure 5A:
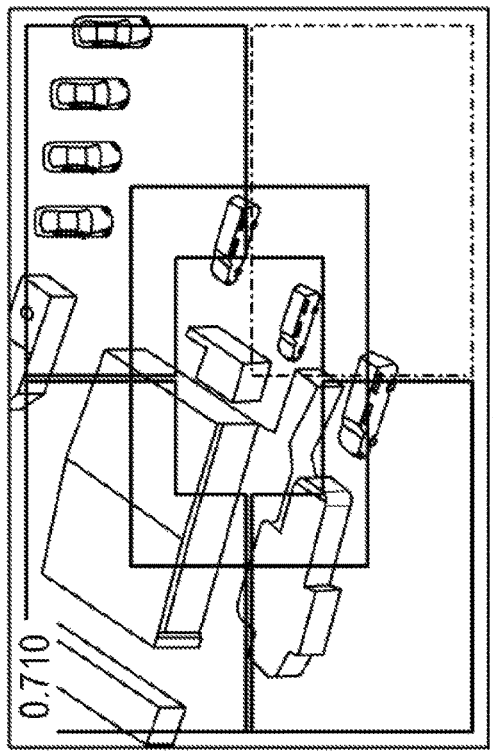
FIGS. 5A-B illustrate a scene classifier algorithm showing manmade scenes.
Figure 5B:
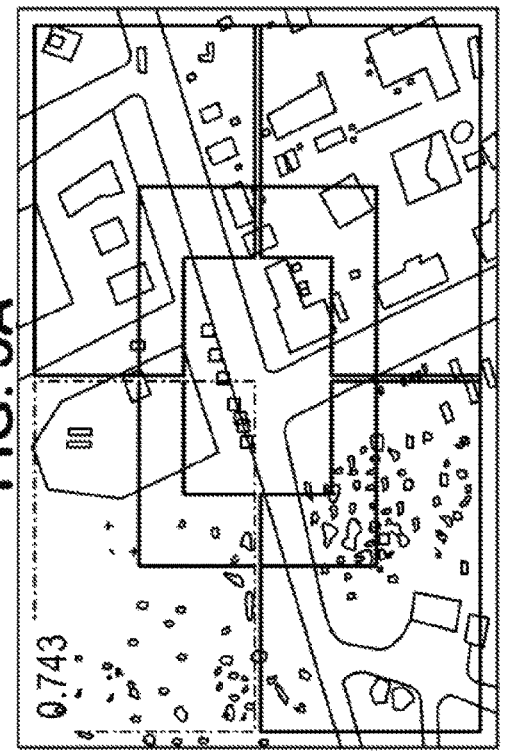

Manmade vs. Natural Scene Classification (global attribute)—This algorithm (see FIGS. 5A-D) aims to characterize a FMV scene as mainly containing either manmade features (such as structures and cars, as shown in FIGS. 5A-B) or natural features (such as desert and vegetation, as shown in FIGS. 5C-D). A nearest-neighbor classifier is applied, trained by example manmade and natural scenes; a script for training the algorithm is included in the delivery. Manmade vs. natural characterization is determined by the scene's edge coherence, i.e. the relationship of strong edge features in the image. For example, manmade structures such as buildings tend to have crisp, 90-degree edges, while vegetation such as bushes and trees tend to have a scattering of random edges. This edge information drives the determination of whether the scene should be considered manmade or natural. The returned global attribute is the percentage of the FMV segment deemed to have manmade features. This attribute allows one to later narrow down a search for FMV based on whether manmade features were present in the video.

Figure 6:
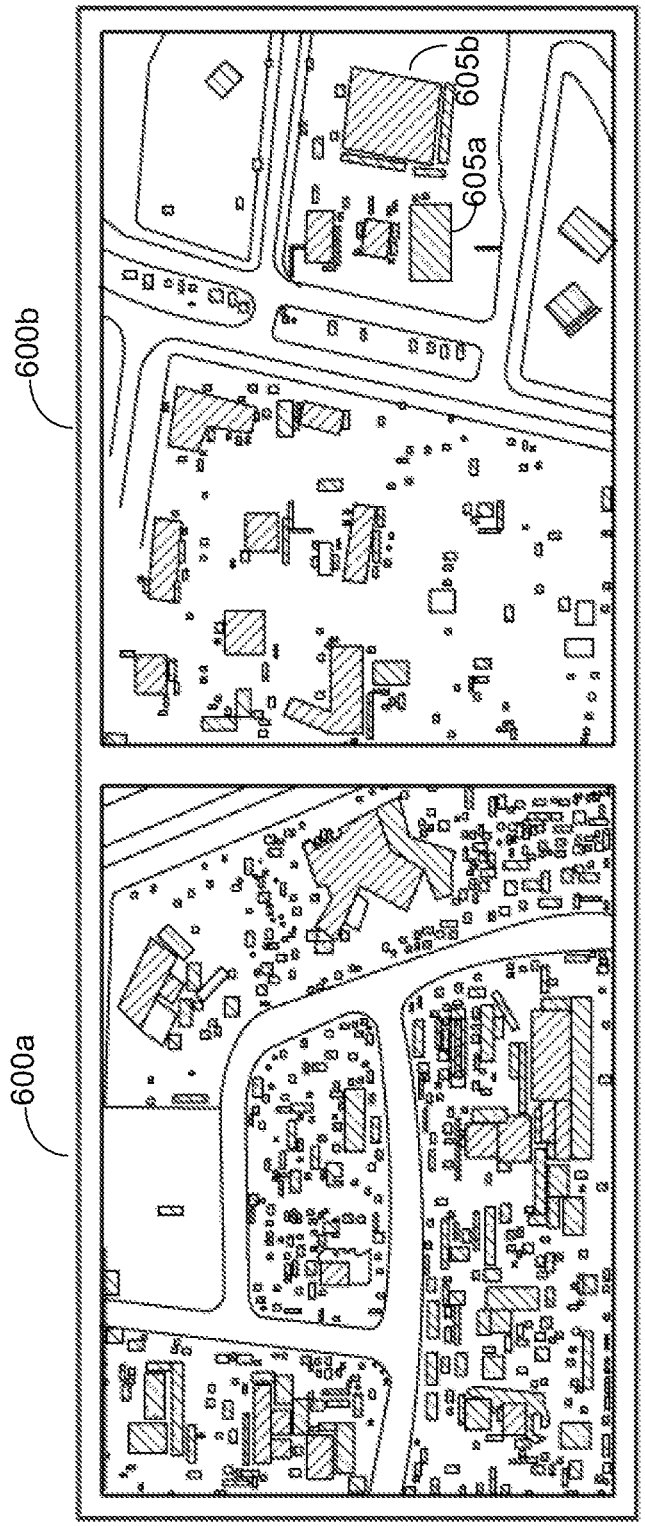
FIG. 6 illustrates building detection examples.

Building Detection (object attribute)—This algorithm analyzes a scene (for example, see scenes 600a-b in FIG. 6) for building structures such as buildings 605a-b, returning to AVATAR a list of detected buildings and their size, color, and geo-location attributes. The algorithm exploits the aerial-view spatial tendencies of buildings, including their typical shape solidity, rooftop lack of detail, strong edges, and cast shadows. Parameters may be modified to allow for smaller structures to be detected, such as small warehouses or storage containers. The object attributes returned to AVATAR allow one to later search for FMV containing buildings with specific features or in a specific location.

The challenge is that Moore's Law can no longer compete with the amount of data available to process from the available video sources. The only way to address this is to scale out to handle the sheer volume of data required to be processed.

In some implementations VADER utilizes Hadoop HDFS to store video and Hadoop MapReduce to process the video. VADER runs a background process that performs a video processing MapReduce job on queued videos, which are transparently added to the processing queue when uploaded through VADER REST services. Using the VADER algorithm framework, relevant video features are extracted and immediately persisted as query-enabled geospatial entities. Moreover, the videos themselves are also stored as entities to be retrieved during the user experience.

1.3.3 User Experience with the Ozone Widget Framework

Figure 7:
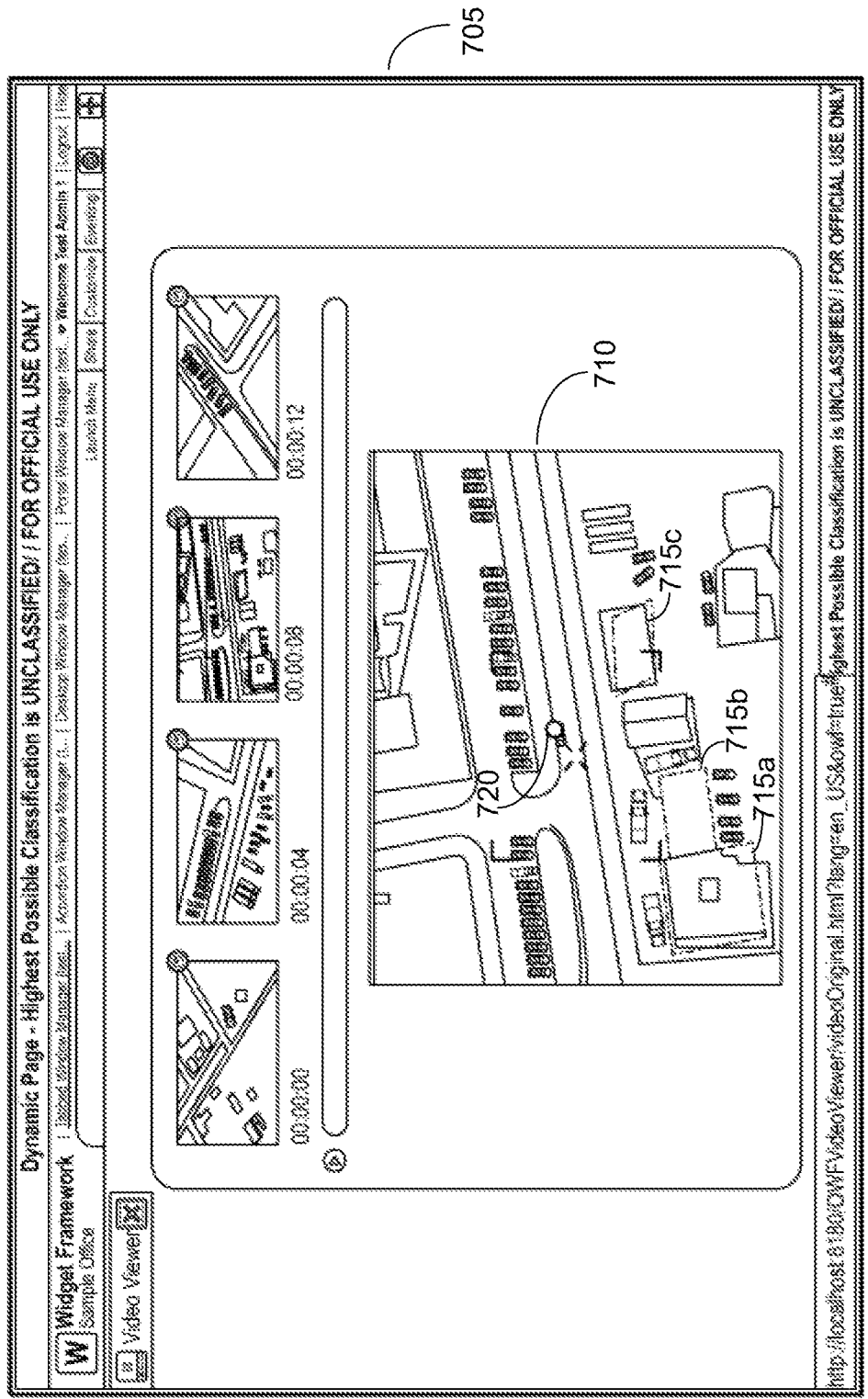
FIG. 7 illustrates an OWF video viewer widget.

In order to standardize to companies and government agencies visual interfaces, the VADER system incorporates a video viewer widget capability. The video viewer widget allows a user to view FMV and other video sources within OWF and supports overlaid with relevant metadata derived from the callbacks to the VADER data stores. As shown in FIG. 7, the viewer 705 is currently displaying an FMV 710 overlaying metadata on top of the video. The boxes 715a-c represent buildings detected by a "building detector" algorithm, and a circle 720 represents a moving vehicle that was detected by a "mover detector" algorithm.

The Video Viewer 705 makes use of the latest HTML5 multimedia capabilities to display video files in a web browser. This includes usage of the new HTML5 <video> tag to display FMV. One of the main benefits of using the <video> tag is that the end user is no longer required to install a specific media plug-in, such as Adobe Flash or Microsoft Silverlight, in order to view a video file. Instead, the <video> tag handles streaming video files from the hosted server directly to the browser and plays them for the user. A primary feature of the video viewer is the metadata overlays, which are programmatically drawn on top of the video using Scalable Vector Graphics (SVG). To draw these overlays, a KML file containing the video's metadata is provided to the video viewer widget, which parses the file using the JavaScript jQuery library. Any algorithm or programming language may be used to process the video(s) and produce the metadata, as long as the end result is a KML file in a common format that can be served up to the video viewer.

The OWF video viewer widget (FIG. 7) takes advantage of the inter-widget communication by opening up a channel and listening for broadcasts of video metadata file pairs. Other OWF widgets can be built or modified to transmit this information between the video viewer. In addition to receiving broadcasts from other widgets, the video viewer also transmits information about the currently playing video and its related metadata. Other widgets can be built or modified to listen on the video viewer's channel for this data. For instance, a map widget might be used to display the footprint of the current video. An image viewer widget might be used to display snapshots of the video at key points of interest. Numerous other widgets could be built to interact with the VADER video viewer widget to create a rich, dynamic FMV experience for the end user.

To support the client, VADER provides a RESTful service for client consumption. The VADER services are implemented using the Play! Framework, known for its speed and ease of development. VADER currently supports operations to upload video files, download video files, inspect the video processing queue, query geo-spatial entities, and query videos. Responses are delivered as JSON.

1.4 Technical Results

As part of our on-going research, IAI is working to improve the efficiencies of all aspects of VADER using a minimal hardware footprint approach that scales with machines numbers and processing power. The IAI cluster is comprised of six nodes running CDH3 (Cloudera's Distribution Including Apache Hadoop) where one node runs the Cloudera Manager, another node runs as the master node (HDFS name node, MapReduce job tracker, HBase master, ZooKeeper server), another node runs a single instance of our REST service, and the remaining nodes run as slave nodes (HDFS data node, MapReduce task tracker, HBase region server).

In the current implementation, with approximately 200,000 random entity inserts per week for 50 random weeks, we are seeing about 100 inserts per second consistently, regardless of how much data is in the data store. Note, the data entities are broken up into week segments to handle temporal queries instead of storing all entities for all time together. Although we are still optimizing the VADER query software, query times are faster than write times. Performance obviously improves with a better hardware configuration.

It is difficult to compare VADER results with other available system because there aren't any geospatial distributed data store available to compare and test against. MongoDB is known for being amazingly fast and has support for geospatial storage and search, but is limited to a single Mongo node. One would have to build a MongoDB-based solution with custom sharding in order to test something comparable to the VADER solution.

1.5 Technical Challenges

The two VADER technical challenges are relatively low risk and mitigated by on-going work on the VADER platform. One of the VADER technical challenges includes processing video using the MapReduce paradigm. In general, video streams are larger than the HDFS 64 MB block size so processing the entire video stream results in significant network traffic. Our approach is to implement a custom MapReduce input format to pull in segmented and overlapping video streams (less than the HDFS 64 MB size) to individual task nodes. With the lower file size, the processing can come to the data while avoiding network traffic.

The other VADER technical challenge is handling multiple video file formats within the OWF video viewer widget. There on-going debate between the different browser vendor over which baseline codec for videos should be universally supported. As a result, every major web browser now supports at least one of the following three video formats in their latest releases: WebM, H.264, and Ogg Theora. Unfortunately, no single codec is yet supported by all the browsers. The video viewer widget was made to be compatible with Firefox, therefore both WebM and Ogg Theora videos are compatible at this point. With minimal additional effort, the video viewer widget can be modified to support other browser baselines.

2.0 Equipment

In some implementations, a VADER system can include the following hardware configuration: Processor: PowerEdge R810 Shipping (20 cores), Intel® Xeon® Processor E7-4850 (24M Cache, 2.00 GHz, 6.40 GT/s Intel® QPI). Memory: 256 GB Memory (16×16 GB), 1066 MHz. OS: SUSE Linux Enterprise Server, Windows Server 8. Disk Drives: 1 TB 7.2K RPM SATA 3 Gbps 2.5 in HotPlug HD 3.0 Computer Software In some implementations, a VADER system can include leveraging the following software packages: Java 6 Runtime Environment, Google Gson 2.1, Google Guava 11.0.2, Google Protocol Buffers 2.3.0, and/or Play! Framework 2.0.1. In addition, in some aspects, the VADER system may use the following cloud frameworks: Cloudera Cluster, CDH3 or alternatively, Hadoop 0.20.2, HBase 0.90.4, and/or Zookeeper 3.3.4.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of accessing full motion video data stored in a geospatial video database supporting search capabilities and having a dimension of time, the method comprising:
   performing a spatial query of the video database; and
   filtering results of the query by time,
   wherein the full motion video data is stored in the geospatial video database within a cell tree having a time interval in which the data exists.

2. The method of claim 1, wherein the spatial query is based on one or more search terms.

3. The method of claim 2, wherein the one or more search terms comprise one or more characteristics of an amount of man-made features in a scene.

4. The method of claim 3, wherein the one or more search terms further comprise one or more characteristics of an amount of natural features in the scene.

5. The method of claim 1, further comprising identifying one or more buildings in at least a portion of the video database.

6. The method of claim 5, further comprising identifying one or more of a size, color, shape solidity, rooftop lack of detail, strong edges, or cast shadows of the identified one or more buildings.

7. The method of claim 1, further comprising receiving a full motion video search request, wherein the search request indicates one or more of a building size, building color, building geo-location attributes, building shape, a building rooftop detail, a building edge characterization, or a building cast shadow characterization, and performing the spatial query based on the search request.

8. The method of claim 1, wherein the one or more search terms comprise one or more characteristics of an amount of natural features in a scene.

9. The method of claim 1, wherein the full motion video data is stored in the geospatial video database with the dimension of time.

10. The method of claim 1, wherein the time interval is a week long.

11. The method of claim 10, wherein if the spatial query crosses the week long time interval boundaries, the spatial query is performed on each overlapped cell tree.

12. The method of claim 1, wherein if the spatial query crosses the time interval boundaries, the spatial query is performed on each overlapped cell tree.

* * * * *